United States Patent [19]
Yerouchalmi

[11] 3,752,333
[45] Aug. 14, 1973

[54] DEVICE FOR AXIAL CHARGING OF A ROTARY MELTING FURNACE

[75] Inventor: David Yerouchalmi, Le Mesnil Saint-Denis, France

[73] Assignee: Commissariat a l'Energie Atomique, Paris, France

[22] Filed: Oct. 16, 1970

[21] Appl. No.: 81,345

[30] Foreign Application Priority Data
Oct. 24, 1969 France .......................... 6936564

[52] U.S. Cl. ................. 214/26, 266/1 R, 266/34, 432/117, 432/116, 432/235
[51] Int. Cl. .................................. F27b 7/32
[58] Field of Search .................. 266/1 R, 10, 11, 266/20, 27, 28; 214/26; 302/59; 263/32, 33

[56] References Cited
UNITED STATES PATENTS
| | | | |
|---|---|---|---|
| 440,469 | 11/1890 | Clark | 266/20 |
| 611,569 | 9/1898 | Duckham | 302/59 |
| 2,323,979 | 7/1943 | Doyle et al. | 266/5 T |
| 2,386,991 | 10/1945 | Thomes | 214/26 |
| 2,739,800 | 3/1956 | Sisco | 266/27 X |
| 3,477,704 | 11/1969 | Sherwood | 266/11 |
| 3,542,350 | 11/1970 | Sherwood | 266/11 |

Primary Examiner—R. Spencer Annear
Attorney—Lane, Aitken, Dunner & Ziems

[57] ABSTRACT

In a rotary melting furnace having two axial openings, a device for axial charging of the furnace comprises a tube which is intended to be introduced along the axis of the furnace through one of the openings. The material to be charged is injected under pressure at one end of the tube together with an addition of volatilizable binder. A lateral orifice is provided at the other end of the tube for injecting the material into the furnace and a drive system is provided for displacing the tube in reciprocating motion.

21 Claims, 1 Drawing Figure

Patented Aug. 14, 1973
3,752,333
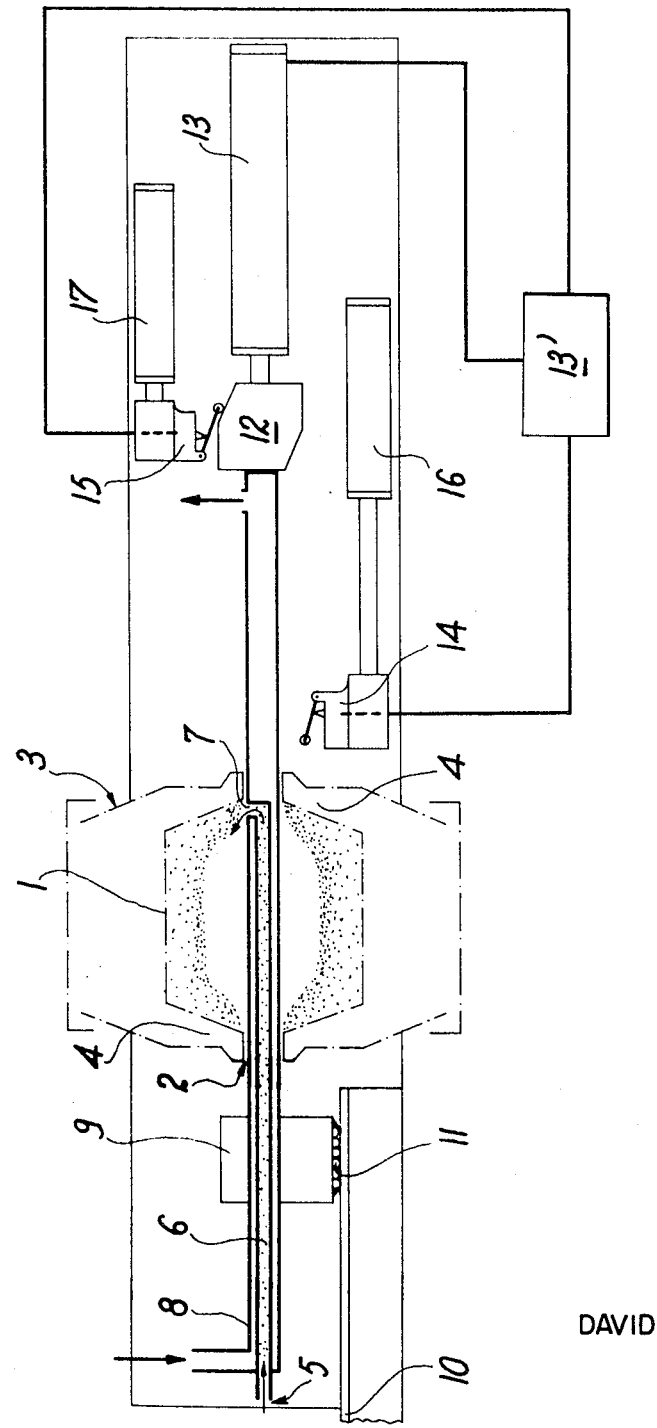
INVENTOR
DAVID YEROUCHALMI
BY Lane, Aitken, Dunner & Ziems
ATTORNEYS

DEVICE FOR AXIAL CHARGING OF A ROTARY MELTING FURNACE

This invention relates to a device for axial charging of a rotary melting furnace, said device being designed primarily for the purpose of carrying out rapid filling of said furnace as soon as a pouring operation has been completed.

In a rotary melting furnace, the material to be melted which can be a simple or composite refractory oxide or which can equally well be either a refractory metal or an element such as carbide, boride, silicide, nitride, sulphide and so forth is charged into a rotary cylindrical shell having a horizontal axis and provided with cooling systems, there being formed in said shell a central cylindrical cavity constituting the heating zone in which a suitable thermal flux penetrates through the axial openings provided at both ends of said cavity. Melting takes place in the central portion of said charge of refractory material (approximately one-third of the total volume charged) whereas the remainder forms a gradual-sintering zone in which the sintering rate decreases towards the cooled shell walls. This is known as melting in an "automatic crucible."

In order to ensure economic performance of this melting process, it is apparent that the molten mass must be recovered immediately without any need to dismantle the end walls of the furnace, this being effected in the majority of cases by tilting the furnace so as to pour off the molten material through one of its axial openings. On the same essential grounds of operating economy, it is also clearly an advantage to recharge the furnace rapidly and immediately after pouring but again without any dismantling, that is to say through the axial openings of the furnace which therefore serve both for charging, heating and pouring.

This invention proposes a device for rapid axial charging of a rotary melting furnace having two axial openings, said device being mainly characterized in that it comprises a tube which is intended to be introduced along the axis of said furnace through one of said openings, the material to be charged together with an addition of volatilizable binder being injected under pressure at one end of said tube and provision being made at the other end of said tube for a lateral orifice for injecting said material into the furnace, and a system for displacing said tube in reciprocating motion.

Further characteristic features of the invention will become apparent from the following description of one embodiment of the charging device according to the invention, this description being given by way of example but not in any limiting sense and reference being made to the single FIGURE of the accompanying drawing, which shows diagrammatically and partly in section a rotary melting furnace and charging device in accordance with the invention.

In this FIGURE, which illustrates a device in accordance with the invention, there is shown diagrammatically in chain-dotted lines the contour of a rotary melting furnace having a rotary cylindrical shell 1 which may or may not be formed of heat-resistant metal and which is intended to receive the charge of material to be melted. Said shell has two frusto-conical extremities which are pierced by axial openings 2 having a structure which permits the use of both openings as noses or nozzles for pouring-off the molten material. Two walls 3 are attached to the frusto-conical extremities of the shell 1 and form in conjunction with these latter two end chambers 4 which permit cooling of the end portions of the shell by delivering a liquid near the axis. The cylindrical portion of the shell is cooled by suitable means such as dowsing with spray tubes (not shown) which are disposed around the periphery of the shell.

The device according to the invention which permits rapid axial charging of a furnace of this type or any other type of rotary furnace having axial openings is shown in full lines in the FIGURE. The refractory material to be melted which may be in the form of either powder or granules is injected under pressure with an addition of organic binder which is volatilizable in the hot state into the extremity 5 of a tube 6 of heat-resistant steel. Said tube is provided at the other extremity with a lateral orifice 7 forming a nozzle for the purpose of injecting the material into the furnace. Said tube is disposed within the interior of a second tube 8 which is introduced along the axis of the furnace through one of the terminal openings 2. The second tube extends beyond the injection nozzle 7 and water is circulated therein at a high flow rate. At a point located near the end at which the material to be melted is injected, said outer tube is supported by a carriage 9 which runs on a rail 10 by means of ball-bearing guides 11. At the other end of said tube, provision is made for means (not shown) which are intended to be disengageable in order to permit withdrawal of the tube from the furnace but serve to couple the tube with the movable portion 12 of a pneumatic jack 13 which operates along the axis of the furnace and the control system of which is shown diagrammatically at 13'. A first end-of-travel contact 14 which is actuated by said movable portion when this latter reaches a predetermined position on the left-hand side serves to initiate reversal of the direction of motion of the jack 13. A second end-of-travel contact 15 which is actuated by said movable portion when it reaches a predetermined position on the right-hand side also serves to initiate reversal of the direction of motion.

The device according to the invention is capable of ensuring substantially uniform charging of the furnace over practically the full length of this latter despite the well known fact that, after a pouring operation, the central zone of the furnace is emptier than the end portions which are located near the pouring nozzles. This is achieved by means of two pneumatic jacks 16 and 17 which define the positions of the end-of-travel contacts 14 and 15 respectively and which, as the filling of the furnace takes place, displace the contact 14 towards the right-hand side and the contact 15 towards the left-hand side simultaneously so as to produce a reduction in amplitude of the reciprocating movements of the injection nozzle 7. It would be quite feasible to operate the two above-mentioned jacks by hand. However, since the volume to be filled remains substantially the same from one pouring operation to the next in the case of a given furnace and a given type of material to be melted, it is an advantage to make use of a common element for electropneumatic programming of the movement of said jacks. Similarly, by reason of a programmed control operation which is carried out by said element, the movements of the injection nozzle 7 which take place normally at a substantially constant speed as imposed by the jack 13 can become movements such that the rate of travel of the nozzle 7 is higher in the end portions in the vicinity of the pouring nozzles than in the central portions.

Thus, charging of the furnace is carried out by subjecting this latter to a movement of rotation whilst the injection nozzle 7 carries out along the axis of the furnace a reciprocating movement of progressively decreasing amplitude at a speed which can either be maintained constant or reduced in the central portion. Since the granules or the powder which are injected through the nozzle 8 receive an addition of volatilizable organic binder, they are maintained in position in spite of the rotation of the furnace. Said binder which will volatilize at the beginning of the heating process will therefore not give rise to any contamination of the material to be melted.

Since charging operations are performed in a hot furnace in the majority of cases, the water which circulates within the tube 8 ensures protection of this latter against overheating which would otherwise be liable to cause damage to the furnace and also has the effect of preventing untimely melting of the material which circulates within the tube 6.

It is readily apparent that the present invention is not limited solely to the embodiment which has been described and illustrated by way of example and that the scope of this patent also extends to alternative forms of either all or part of the arrangements described which remain within the definition of equivalent means as well as to all applications of such arrangements.

What we claim is:

1. An improvement capable of rapidly depositing a substantially uniform charge across the entire length of a rotary melting furnace of the type that has two axial openings, the improvement comprising a conduit capable of being inserted through one of the axial openings and reaching across substantially the entire length of the furnace, means for injecting under pressure into one end of the conduit the material to be charged, the conduit including a lateral opening at the other end for discharging said material into the furnace, said conduit further including cooling means for maintaining the temperature of the conduit below the melting temperature of the material being charged, drive means for moving the conduit back and forth along the furnace length, and means for limiting the amplitude of said back and forth movement and reversing the direction of movement of the conduit when predetermined limits are reached.

2. The improvement in claim 1, wherein the conduit is tubular in shape.

3. The improvement in claim 1, wherein the cooling means is a water jacket.

4. The improvement in claim 3, wherein the water jacket projects beyond the lateral opening of the conduit and through the other axial opening.

5. The improvement in claim 1, wherein the drive means is a pneumatic jack coupled to the conduit.

6. The improvement in claim 5, wherein the pneumatic jack and conduit are disengageable.

7. The improvement in claim 1, wherein means for limiting and reversing include a pair of limit switches connected to the drive means.

8. The improvement in claim 1, wherein the conduit rests on a carriage capable of moving back and forth in response to movement of the conduit.

9. An improvement capable of rapidly depositing a substantially uniform charge across the entire length of a rotary melting furnace of the type that has two axial openings, the improvement comprising a conduit capable of being inserted through one of the axial openings and reaching across substantially the entire length of the furnace, means for injecting under pressure into one end of the conduit the material to be charged, the conduit including a lateral opening at the other end for discharging said material into the furnace, drive means for moving the conduit back and forth along the furnace length, means for limiting the amplitude of said back and forth movement and reversing the direction of movement of the conduit when predetermined limits are reached, and means for selectively adjusting the limits of said means for limiting and reversing, so that the amplitude of said back and forth movement can be progressively reduced while the furnace is being charged.

10. The improvement in claim 9, wherein the conduit is tubular in shape.

11. The improvement in claim 9, and further including cooling means for maintaining the temperature in the conduit below the melting temperature of the material being charged.

12. The improvement in claim 11, wherein the cooling means is a water jacket.

13. The improvement in claim 12, wherein the water jacket projects beyond the lateral opening of the conduit and through the other axial opening.

14. The improvement in claim 9, wherein the drive means is a pneumatic jack connected to the conduit.

15. The improvement in claim 14, wherein the pneumatic jack and conduit are disengageable.

16. The improvement in claim 9, wherein means for limiting and reversing are a pair of limit switches connected to the drive means.

17. The improvement in claim 9, wherein the conduit rests on a carriage capable of moving back and forth in response to the movement of the conduit.

18. The improvement in claim 9, wherein the means for selectively adjusting includes a pair of pneumatic jacks.

19. The improvement in claim 18, wherein the means for limiting and reversing include a pair of limit switches, each switch being mounted on one of the pneumatic jacks.

20. The improvement in claim 9, and further including a program element for controlling the selective adjustment of said limits.

21. The improvement in claim 19, wherein said program element also controls said drive means.

* * * * *